US010726204B2

(12) United States Patent
Crudele et al.

(10) Patent No.: US 10,726,204 B2
(45) Date of Patent: Jul. 28, 2020

(54) TRAINING DATA EXPANSION FOR NATURAL LANGUAGE CLASSIFICATION

(71) Applicant: INTERNATIONAL BUSINESS MACHINES CORPORATION, Armonk, NY (US)

(72) Inventors: Michele Crudele, Rome (IT); Antonio Perrone, Rome (IT)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 15/988,295

(22) Filed: May 24, 2018

(65) Prior Publication Data

US 2019/0361977 A1 Nov. 28, 2019

(51) Int. Cl.
| G06F 17/27 | (2006.01) |
| G06F 40/226 | (2020.01) |
| H04L 12/58 | (2006.01) |
| G06K 9/62 | (2006.01) |
| G06F 40/30 | (2020.01) |
| G06F 40/211 | (2020.01) |
| G06F 40/284 | (2020.01) |

(52) U.S. Cl.
CPC .......... *G06F 40/226* (2020.01); *G06F 40/211* (2020.01); *G06F 40/284* (2020.01); *G06F 40/30* (2020.01); *G06K 9/6256* (2013.01); *H04L 51/02* (2013.01)

(58) Field of Classification Search
None
See application file for complete search history.

(56) References Cited

U.S. PATENT DOCUMENTS 7,016,849 B2 * 3/2006 Arnold .................... G10L 15/32
704/275
7,231,343 B1 * 6/2007 Treadgold ............. G06F 40/247
704/9

(Continued)

FOREIGN PATENT DOCUMENTS

CN 104850539 A 8/2015
CN 105786798 A 7/2016

OTHER PUBLICATIONS

Gliozzo et al., "Bootstrapping Chatbots for Novel Domains", Dec. 2017, 8 Pages, ResearchGate, https://www.researchgate.net/publication/321664993.

(Continued)

*Primary Examiner* — Satwant K Singh
(74) *Attorney, Agent, or Firm* — Steven M. Bouknight

(57) ABSTRACT

A computer-implemented method for training a natural language classifier associated with a chat interface of a computer system is provided. The method may include receiving a training dataset comprising an initial set of expressions corresponding to an intent. Additional expressions corresponding to the intent may be generated, wherein the additional expressions are generated based on the initial set of expressions corresponding to the intent. The natural language classifier may be trained based on the initial set of expressions and the additional expressions corresponding to the intent. The trained natural language classifier may be implemented to determine an intent expressed by a detected query based on the initial set of expressions and the additional expressions by which the natural language classifier was trained.

20 Claims, 6 Drawing Sheets

(56) References Cited

U.S. PATENT DOCUMENTS

| | | | |
|---|---|---|---|
| 8,036,877 B2* | 10/2011 | Treadgold | G06F 40/247 |
| | | | 704/9 |
| 8,818,926 B2 | 8/2014 | Wallace | |
| 9,905,248 B2* | 2/2018 | Dey | G10L 25/48 |
| 10,423,725 B2* | 9/2019 | Zhou | G06N 5/022 |
| 10,553,203 B2* | 2/2020 | Dolph | G10L 13/043 |
| 2017/0052947 A1 | 2/2017 | Wang | |
| 2017/0206797 A1* | 7/2017 | Solomon | G09B 7/08 |
| 2017/0243107 A1 | 8/2017 | Jolley et al. | |
| 2017/0270095 A1* | 9/2017 | Ichimura | G06F 40/268 |
| 2018/0025726 A1* | 1/2018 | Gatti de Bayser | H04L 51/32 |
| | | | 704/257 |
| 2018/0307676 A1* | 10/2018 | Ben Shahar | G06F 17/2785 |
| 2018/0308476 A1* | 10/2018 | Hirzel | G06F 40/35 |
| 2019/0104093 A1* | 4/2019 | Lim | G06F 11/0766 |
| 2019/0189117 A1* | 6/2019 | Kumar | H04L 12/1827 |
| 2019/0294673 A1* | 9/2019 | Sapugay | G06F 40/247 |
| 2019/0311036 A1* | 10/2019 | Shanmugam | G06F 16/951 |
| 2019/0384815 A1* | 12/2019 | Patel | G06F 40/247 |

OTHER PUBLICATIONS

Rucha, "Helping Chatbots to Better Understand User Requests Efficiently Using Human Computation", Aug. 21, 2017, 91 Pages, TUDelft Web Information Systems, Delft, the Netherlands, http://wis.ewi.tudelft.nl.

Mell et al., "The NIST Definition of Cloud Computing", NIST, Sep. 2011, 7 Pages, Special Publication 800-145, U.S. Department of Commerce, Gaithersburg, MD.

Patent Cooperation Treaty, "International Search Report (PCT Article 18 and Rules 43 and 44)", dated Sep. 17, 2019, 4 pages, International Application No. PCT/IB2019/053517.

\* cited by examiner

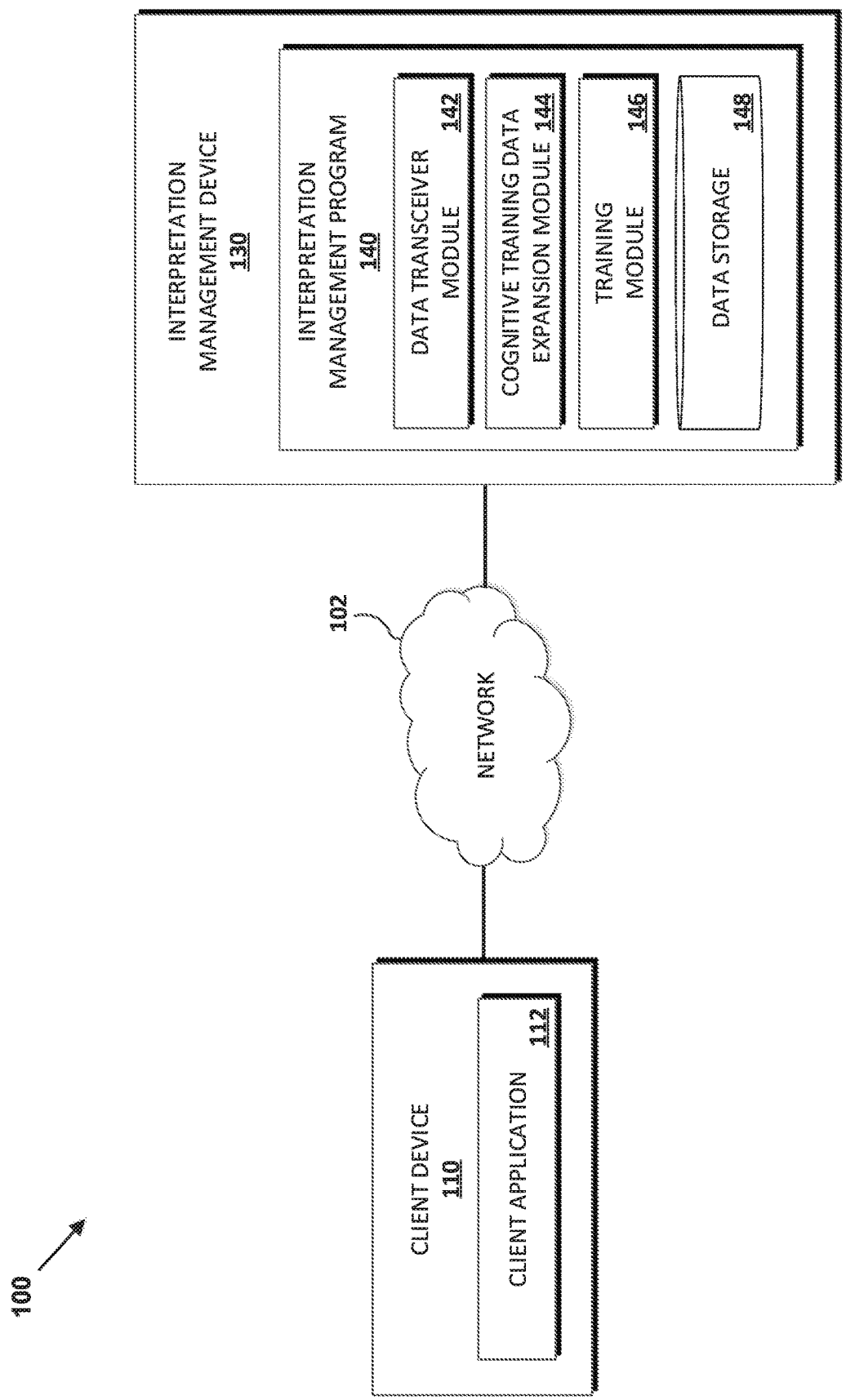

TRAINING DATA EXPANSION FOR NATURAL LANGUAGE CLASSIFICATION

BACKGROUND

The present invention relates generally to the field of natural language processing, and in particular to developing training data for training a natural language classifier.

Chatbots, talkbots, instant messaging bots, artificial conversational entities, and the like, ("chatbots") are computer software programs designed to simulate natural language communication, conversation, and dialogue with humans and end-users. An important function of a chatbot may include understanding, interpreting, and determining an expressed intent of user input from an end-user. The expressed intent may include, for example, free-form text and/or utterances. The chatbot may support and facilitate natural language communications with the end-user by correctly determining the expressed intent of the user input, for example, to correctly and appropriately generate meaningful, helpful, or otherwise desired output in response to the user input. That is, the chatbot may generate desired outputs by correctly determining expressed intents of user inputs. For example, a chatbot capable of sufficiently determining variously expressed intents may be applied in supporting and facilitating natural language communications with a wide range of end-users so as to respond to queries, answer questions, and provide information in response to requests, such as "I want to change the password of my system," or "I did a mistake registering my phone number, I need to correct it." Such intents may be expressed in many different ways by the end-users.

The chatbot may determine an expressed intent by implementing a natural language classifier (NLC) to disambiguate, understand, and interpret the expressed intent, such as by way of text classification. The NLC may be implemented in classifying, categorizing, or grouping the expressed intent with respect to a corresponding class or set of corresponding expressions. The classification may be performed with a degree of confidence represented by a confidence score. The degree to which the chatbot may correctly determine the expressed intent may depend on an accuracy of the classification by the NLC. The confidence score may reflect the accuracy or level of certainty by which the classification of the intent may be determined, which may depend on a level and granularity of understanding and interpretation ("natural language comprehension") by and of the NLC of the expressed intent.

SUMMARY

According to an aspect of the present invention, a computer-implemented method, computer system, and computer program product for training a natural language classifier associated with a chat interface of a computer system is provided. The method may include receiving a training dataset comprising an initial set of expressions corresponding to an intent. Additional expressions corresponding to the intent may be generated, wherein the additional expressions are generated based on the initial set of expressions corresponding to the intent. The natural language classifier may be trained based on the initial set of expressions and the additional expressions corresponding to the intent. The trained natural language classifier may be implemented to determine an intent expressed by a detected query based on the initial set of expressions and the additional expressions by which the natural language classifier was trained.

BRIEF DESCRIPTION OF THE DRAWINGS

FIG. 1 is a functional block diagram depicting an interpretation management system, in accordance with an embodiment of the present invention.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 2A:
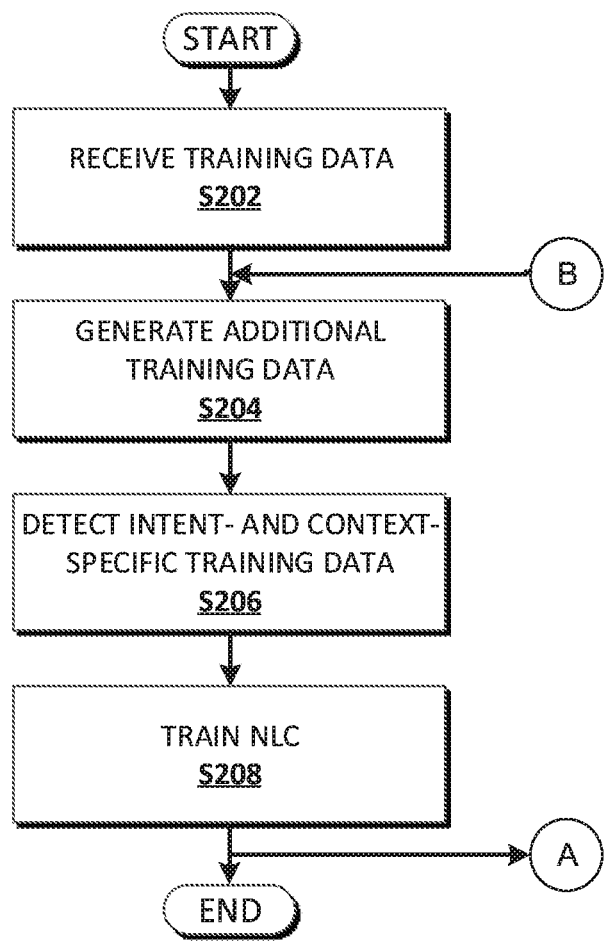
FIG. 2A is a flowchart depicting operational steps of an aspect of the interpretation management system, in accordance with an embodiment of the present invention.

Detailed embodiments of the present invention are disclosed herein for purposes of describing and illustrating claimed structures and methods that may be embodied in various forms, and are not intended to be exhaustive in any way, or limited to the disclosed embodiments. Many modifications and variations will be apparent to those of ordinary skill in the art without departing from the scope and spirit of the disclosed embodiments. The terminology used herein was chosen to best explain the principles of the one or more embodiments, practical applications, or technical improvements over current technologies, or to enable those of ordinary skill in the art to understand the embodiments disclosed herein. As described, details of well-known features and techniques may be omitted to avoid unnecessarily obscuring the embodiments of the present invention.

References in the specification to "one embodiment," "an embodiment," "an example embodiment," or the like, indicate that the embodiment described may include one or more particular features, structures, or characteristics, but it shall be understood that such particular features, structures, or characteristics may or may not be common to each and every disclosed embodiment of the present invention herein. Moreover, such phrases do not necessarily refer to any one particular embodiment per se. As such, when one or more particular features, structures, or characteristics is described in connection with an embodiment, it is submitted that it is within the knowledge of those skilled in the art to affect such one or more features, structures, or characteristics in connection with other embodiments, where applicable, whether or not explicitly described.

The performance and effectiveness of a chatbot depends on the natural language comprehension by and of which the chatbot may determine (i.e., via an NLC) variously expressed intents. Higher and more granular levels of understanding and interpretation may allow for more accurate determinations to be made, enabling better performance by the chatbot in meaningfully communicating with end-users.

For example, user inputs from end-users including requests, phrases, or questions such as "I want to change the password of my system," "I forgot the password of my system, can you send it to me?", and "I lost the password. How can I recover it?" express similar but distinct intents having slightly varying requirements. A limited understanding or a coarse interpretation of the expressed intents may reduce the usefulness and utility of a chatbot, causing the chatbot to determine each of the intents as relating only to "password," thereby reducing the chatbot's ability to support and facilitate natural language communications with end-users. As such, outputs produced by the chatbot with respect to the user inputs may be less meaningful, helpful, and desirable, and may only be partially relevant with respect to compatibly expressed intents. A less limited understanding or a fine-grained interpretation of the expressed intents may increase the usefulness and utility of a chatbot, enabling the chatbot to determine each of the intents as relating to "password_change," "password_email_recovery," and/or "password_recovery," respectively, thereby increasing the chatbot's ability to support and facilitate natural language communications with end-users. As such, outputs produced by the chatbot with respect to the user inputs may be more meaningful, helpful, and desirable, and may be sufficiently relevant to variously expressed intents.

A degree of natural language comprehension by and of an NLC may be developed based on carefully prepared and curated training data. The training data may include, for example, data objects based on texts and/or speech of corpora corresponding to historical or representative expressed intents. The training data may be prepared to include, for example, classifications of the expressed intents associating individual expressions of the corpora to corresponding classes or categories of intents related to natural language usage in a domain in which the NLC may be applied. The NLC may perform a "training" stage in which learning models learn natural language rules based on the training data to develop a machine representation model for enabling the natural language comprehension by and of the NLC.

A high degree of natural language comprehension with respect to a particular expressed intent may be achieved based on training data including numerous distinct, diversified, and expansive expressions corresponding to the particular expressed intent, such as may be based on a wide variety of texts and/or speech of corpora. The training data including the numerous expressions may be difficult, time-consuming, and resource-intensive, as there may be any number of such expressions corresponding to the intent that may be conceived by end-users.

For example, an expression corresponding to an intent to change a password may include, for example, natural language requests, phrases, or questions such as "I want to change the password of my system," "I want to modify the password," "I'd like to change the password of my account," "I need to insert a new password for my laptop," and so on. Still, there may be countless other ways in which the intent to change the password may be expressed. Further, the natural language usage of individual end-users may influence expressions of the intent, which may evolve and develop over time such as based on factors related to cultural influences, demographics, end-user age, provenance, etymology, and linguistic adaptations and developments (e.g., slang), and so on.

Accordingly, there is a need in the art for a method of efficiently developing training data for training an NLC, to produce high degrees of natural language comprehension by and of the NLC of variously expressed intents.

Embodiments of the present invention are directed to a method for efficiently developing training data for training an NLC, to produce high degrees of natural language comprehension by and of the NLC of variously expressed intents.

In an aspect, the method may be implemented to efficiently expand upon initial training data including an initial set of expressions corresponding to an intent, to generate updated training data including a corresponding, expanded set of distinct, diversified, and expansive expressions corresponding to the intent by which a high degree of natural language comprehension by and of the NLC of the intent may be achieved. The updated training data may be generated based on the initial training data with respect to the initial set of expressions corresponding to the intent, where the initial set of expressions may be, for example, classified, categorized, grouped, or labeled with respect to the intent.

In various aspects, the method may include receiving or retrieving initial training data including an initial set of expressions corresponding to an intent, generating updated training data including a corresponding and expanded set of distinct, diversified, and expansive expressions corresponding to the intent, wherein the expanded set of expressions are generated based on the initial set of expressions corresponding to the intent, and training an NLC based on the updated training data to produce a high degree of natural language comprehension by and of the NLC with respect to the intent.

Advantageously, the present invention may be implemented to efficiently expand upon initial training data including an initial set of expressions corresponding to an intent, to generate updated training data including a corresponding, expanded set of distinct, diversified, and expansive expressions corresponding to the intent by which a high degree of natural language comprehension by and of an NLC of the intent may be achieved. The present invention may be implemented to reduce the difficulty, and time and resource costs that would otherwise be required to generate the updated training data including the corresponding, expanded set of distinct, diversified, and expansive expressions corresponding to the intent by which the high degree of natural language comprehension by and of the NLC of the intent may be achieved. In particular, the updated training data may be generated based on initial training data including a limited and small initial set of expressions corresponding to the intent that would otherwise allow for only a low or limited degree of natural language comprehension with respect to the intent.

FIG. 1 is a functional block diagram depicting an interpretation management system 100, in accordance with an embodiment of the present invention. The interpretation management system 100 may include a client device 110 and an interpretation management device 130, interconnected over a network 102. While FIG. 1 depicts two discrete devices, other arrangements may be contemplated. For example, the client device 110 and/or the interpretation management device 130 may include one or more integrated or distinct devices.

In various embodiments of the present invention, the network 102 may include, for example, an intranet, a local area network (LAN), a personal area network (PAN), a wireless local area network (WLAN), a wireless personal area network (WPAN), a wireless mesh network, a wide area network (WAN) such as the Internet, or the like. The network 102 may include wired, wireless, or fiber optic connections. Generally, the network 102 may include any combination of connections and protocols for supporting communications between the client device 110 and the interpretation management device 130, in accordance with embodiments of the present invention.

In various embodiments of the present invention, the client device 110 and/or the interpretation management device 130 may include a computing platform such as a wearable device, an implantable device, a mobile or smart phone, a tablet computer, a laptop computer, a desktop computer, a server such as a database server, a virtual machine, or the like. In the various embodiments, the client device 110 and/or the interpretation management device 130 may otherwise include any other type of computing platform, computer system, or information system capable of sending and receiving data to and from another device, such as by way of the network 102. In certain embodiments, the client device 110 and/or the interpretation management device 130 may include internal and external hardware components, such as described with reference to FIG. 3. In other embodiments, the client device 110 and/or the interpretation management device 130 may be implemented in a cloud computing environment, such as described with reference to FIGS. 4 and 5.

In an embodiment of the present invention, the client device 110 may include, for example, a client computing platform that hosts a client application 112. The client device 110 may implement a combination of devices and technologies such as network devices and device drivers to support the operation of the client application 112 and to provide a platform enabling communications between the client device 110 and the interpretation management device 130, in accordance with embodiments of the present invention.

The client application 112 may include, for example, an application or program such as a software program, one or more subroutines contained in a program, an application programming interface, or the like. In an embodiment of the present invention, the client application 112 may be implemented in receiving training data.

In an embodiment of the present invention, the training data may include, for example, natural language expressions corresponding to an intent. In the embodiment, the natural language expressions may be represented by a vocabulary of terms. In the embodiment, the vocabulary of terms may be domain specific, or may otherwise correspond to a particular class or domain of expressed intents. The vocabulary of terms may form a basis for training the NLC to map and associate an initially unknown expressed intent with the domain of expressed intents.

For example, a training set (i.e., training data), TS, may include a natural language expression such as "I want to change password," i.e., TS={'I want to change password'}. The training set, TS, may include vocabulary of terms, V, including the terms "I," "want," "to," "change," and "password," i.e., V={'password', 'change', 'I', 'want', 'to' }. For purposes of the present disclosure, "training data" may reference a corresponding training set.

An expression corresponding to an intent ("expressed intent") may include, for example, natural language expressions (e.g., phrases, utterances, etc.) represented by arrangements of text including strings or sets of sentences, words, and letters that may convey or communicate a particular desire, sentiment, concept, idea, and the like. An expressed intent may include, for example, a request, phrase, question, document, statement, exclamation, command, utterance, and the like. A class, domain, category, or taxonomy of expressed intents may include, for example, a group of similar or related natural language expressions corresponding to the same answer, topic, or overall intent. A class of expressed intents may be labeled or otherwise associated with respect to a corresponding intent, and may include slightly different expressions corresponding to the intent. For example, a class of expressed intents may include natural language expressions that are often used in a particular field or domain. For purposes of the present disclosure, "text" and "term" may reference a term such as a word or a string of words (e.g., a sentence or a phrase) of a vocabulary of terms.

In an embodiment of the present invention, the training data may include, for example, "initial" training data including an initial set of expressions corresponding to an intent. The initial training data may be provided by an NLC development manager, e.g., a person tasked with managing the performance of an NLC with respect to training data applied in training the NLC. The initial training data may be implemented in performing a training stage in which learning models learn natural language rules based on the training data to develop a machine representation model for enabling the natural language comprehension by and of the NLC, based on the initial set of expressions corresponding to the intent.

For example, a first chatbot may be trained based on a vocabulary of terms including the English vocabulary, or at least a subset of the English vocabulary, as such may be meaningful or otherwise related to the domain of expressed intents that may be desirable for the chatbot to understand. A second chatbot may be trained based on a vocabulary of terms including the entire English vocabulary where it may be desirable for the chatbot to understand a wide ranging domains of knowledge. A third chatbot may be trained based on a restricted vocabulary of terms including a sports vocabulary where it may be desirable for the chatbot to understand a domain of knowledge related to sports.

In an embodiment of the present invention, the training data may include, for example, updated training data. In the embodiment, the updated training data may include, for example, an expanded set of distinct, diversified, and expansive expressions corresponding to the intent of the initial training data.

For purposes of the present disclosure, "updated training data" may reference expanded training data and vice-versa. Further, "initial training data" may reference training data that forms the basis for generating the updated training data.

As an example, an NLC manager may prepare and curate the initial training data by compiling a group or class of natural language expressions having a common intent. The NLC manager may input the initial training data to the client application 112 for communication to and training of the NLC. The group of natural language expressions may be, for example, selected from or identified with respect to a corpus. The corpus and the group of natural language expressions may be domain-specific (e.g., related to a common topic such as sports). The corpus and the group of natural language expressions may be selected in accordance with the domain in which the NLC may be applied. The natural language expressions may include historically expressed intents from or by end-users of the chatbot by which the NLC may be applied.

In an embodiment of the present invention, the client application 112 may be implemented in receiving data corresponding to user input from an end-user. In the embodiment, the user input may include, for example, an intent expressed by free-form text and/or utterances. In the embodiment, the user input may include, for example, user feedback. In the embodiment, the data corresponding to the user input may be received during application of a trained NLC in a domain, after the performance of the training stage in accordance with embodiments of the present invention. For example, the user input may be received by a chatbot by which the trained NLC may be implemented. The intent expressed by the user input may include an expression corresponding to that of the training data by which the NLC may be trained. In the embodiment, the end-user may communicate the user input to the NLC as part of natural language communications between the end-user and the trained NLC. In the embodiment, the user input may be communicated by way of the node, as previously described.

In an embodiment of the present invention, the interpretation management device 130 may include, for example, a computing platform that hosts an interpretation management program 140. The interpretation management device 130 may implement a combination of devices and technologies such as network devices and device drivers to support the operation of the interpretation management program 140 and to provide a platform for supporting communications between the client device 110 and the interpretation management device 130, in accordance with embodiments of the present invention.

The interpretation management program 140 may include, for example, an application or program such as a software program, one or more subroutines contained in a program, an application programming interface, or the like. The interpretation management program 140 may communicate with the client application 112 to receive the training data and the query data. The interpretation management program 140 may include a data transceiver module 142, a cognitive training data expansion module 144, a training module 146, and a data storage 148.

The data transceiver module 142 communicates with the client application 112. In an embodiment of the present invention, the communications may include retrieving the initial training data from the client application 112, such as may be received from the NLC development manager. In the embodiment, the communications may further include transmitting the updated training data to the client application 112, such as may be generated by the cognitive training data expansion module 144, as described in further detail below. The data transceiver module 142 may store the retrieved data in the data storage 148 for later retrieval and use. The client application 112 may apply the training data in training an NLC, in accordance with embodiments of the present invention.

The cognitive training data expansion module 144 generates the updated training data based on the initial training data. In the embodiment, the updated training data may include an expanded set of distinct, diversified, and expansive expressions corresponding to the intent of the initial training data by which a degree of natural language comprehension by and of the NLC of the intent may be improved. In the embodiment, the updated training data may include the expanded set of expressions and the initial set of expressions. The cognitive training data expansion module 144 may include and implement, for example, a statistical language model including a machine learning algorithm to generate the additional expressions.

Generally, a statistical language model may represent and be implemented in determining a probability distribution over word sequences. Statistical language models may be implemented in various text mining and text analytics (i.e., including those related to text classification) domains. In an embodiment of the present invention, the statistical language model may include, for example, a unigram language model (e.g., an n-gram language model, where n=1). Other types of statistical language models may be implemented to generate the additional expressions corresponding to the intent, in accordance with embodiments of the present invention.

For example, a particular statistical language model may include, for example, a vocabulary of terms, $V=\{w_1, w_2, \ldots, w_M\}$, a collection of text documents, $C=\{d_1, d_2, \ldots, d_N\}$, and a probability distribution, $p(w_k|w_1, w_2, \ldots, w_{k-1})$. In an embodiment of the present invention, where the vocabulary of terms (V) is built or generated based on a collection of text documents (C), the statistical language model may describe or otherwise define, for example, a probability distribution, $p(w_k|w_1, w_2, \ldots, w_{k-1})$, for each term (e.g., $w_k$) in the vocabulary of terms V.

As such, given observation of a sequence of words, "$w_1, w_2, \ldots, w_{k-1}$," $p(w_k|w_1, w_2, \ldots, w_{k-1})$ describes the probability of subsequently observing the word, "$w_k$," in any document of the collection, C (e.g., $d_1$). The unigram language model may, for example, assume that all terms occur or are observable independently of each other. In which case, $p(w_k|w_1, w_2, \ldots, w_{k-1})=p(w_k)$, where $\text{Sum}[p(w_k)]=1$. For example, the estimation of the unigram language model may be $p(w_k)=$ frequency of $w_k$ in $C=c(w_k)/|C|$ where $c(w_k)$ is the number of occurrences of a term, e.g., $w_k$ in C, and $|C|$ is the total number of terms in C.

The training module 146 trains the NLC based on the training data and the query data. In an embodiment of the present invention, the training data by which the NLC may be trained may include, for example, the initial set of expressions corresponding to the intent and the additional expressions corresponding to the intent. The additional expressions may include those generated by the cognitive training data expansion module 144.

FIG. 2A is a flowchart depicting operational steps of an aspect of the interpretation management system 100, in accordance with an embodiment of the present invention.

At Step S202, the data transceiver module 142 retrieves the initial training data from the client application 112.

At Step S204, the cognitive training data expansion module 144 generates the updated training data based on the initial training data. The updated training data may include the expanded set of distinct, diversified, and expansive expressions corresponding to the intent of the initial training data.

In an embodiment of the present invention, the updated training data may be generated based on the initial training data with respect to the initial set of expressions corresponding to the intent, where the initial set of expressions may be, for example, classified, categorized, grouped, or labeled with respect to the intent. In the embodiment, an expressed intent in the expanded set of expressions may be generated, for example, based on the initial training data by derivation from one or more terms of the vocabulary of terms, as previously described.

For example, updated training data, TS', may be generated based on initial training data, TS. The initial training data, TS, may include an initial set of expressions, where $TS=\{text_1, text_2, \ldots, text_N\}$. The updated training data, TS', may include an expanded set of expressions, where $TS'=\{text_1', text_2', \ldots, text_P'\}$, and $P \gg N$. The updated training data, TS', may include a cardinality, P, which may be greater than the a cardinality, N, of the initial training data, TS. The expanded training set, TS', may be generated by derivation from the initial training set, TS. For instance, $text_1'$ of the expanded training set may be generated by permutation of synonyms corresponding to $text_1$ of the initial training set TS. In other words, TS' may be generated based on TS by taking each text in TS, $text_i$, and generating additional texts, $text_i'$ by permutation of the synonyms of the words of $text_i$. TS' may be generated so as to include a cardinality exceeding that of TS. Permutation of the synonyms may be performed to intelligently select the synonyms used in the permutation process.

In an embodiment of the present invention, the updated training data, TS', may include both TS and TS'. The expanded training set may be generated by implementing text classification with respect to the initial training set. In the embodiment, the text classification may include parsing and tokenization of texts in and of the initial vocabulary of terms.

For example, parsing expressions (e.g., $text_i$) in the initial training set may include implementing a natural language parser, which is a program that works out the grammatical structure of sentences, for instance, which groups of words go together (as "phrases") and which words are the subject or object of a verb. Tokenization of the expressions, given a character sequence and a defined document unit, may include the task of chopping it up into pieces, called tokens, perhaps at the same time throwing away certain characters, such as punctuation.

In an embodiment of the present invention, the expanded training set may be generated based on expressions (e.g., $text_1$) of the initial training set. In the embodiment, parsing and tokenization may be performed to generate texts of the expanded training set to represent the expanded set of expressions by parsing and tokenization of expressions of the initial training set, selecting one or more terms of the vocabulary of terms based on the parsing and tokenization, and deriving the texts of the expanded training set from the selected one or more terms of the vocabulary of terms. In the embodiment, the selected one or more terms may include nouns, adjectives, and verbs corresponding to the expressed intent. In the embodiment, part-of-speech (POS) tagging may be implemented in the parsing and tokenization of the expressions. For example, part-of-speech (POS) tagging may be applied to parse and tokenize each term (e.g., $text_k$) in TS. The parsing and tokenization may be performed, for example, by applying parsing and tokenization software such as Stanford CoreNLP. For purposes of the present disclosure, "derived term(s)" may refer to one or more tokenized, parsed, and selected terms; and "deriving the term(s)" may refer to the process of parsing, tokenizing, and selecting the one or more terms.

In an embodiment of the present invention, after deriving the terms, synonyms and abbreviations for each derived term may be determined. The synonyms and abbreviations for each term may be determined, for example, by implementing a natural language processing tool such as WordNet. The particular natural language processing tool that may be implemented may be chosen as a matter of design.

In an embodiment of the present invention, the determined synonyms and abbreviations for each term may be permutated. In the embodiment, the expanded set of expressions may be generated and developed by permutation of the determined synonyms and abbreviations. For example, an expanded training set TS' may include additional expressions, e.g., $text'_j$, which may be generated with respect to one or more terms of the vocabulary of terms of an initial training set, TS. In the embodiment, the derived training set, TS', may include each permutated synonym and abbreviation, accordingly. In the embodiment, the derived training set, TS', may be added or otherwise incorporated into the training data.

As an example, initial training data, TS, may include a natural language expression corresponding to an intent, such as "I want to change the password of my system." That is, TS={'I want to change the password of my system'}". The intent may relate to a desire to change a password. Texts including nouns, adjectives, and verbs of TS may be parsed and tokenized to determine and select corresponding synonyms and abbreviations for subsequent permutation. In the example, the parsed and tokenized texts may include "change," "password," and "system." For instance, synonyms and abbreviations for "change" may include "modify" and "alter"; synonyms and abbreviations for "password" may include "watchword," "passcode," and "pwd"; and synonyms and abbreviations for "system" may include "device," "computer," and "website."

In an embodiment of the present invention, the derived terms may include domain-specific texts, context-specific texts, and the like. That is, the derived terms may include terms specifically related to the intent associated with the initial training data, TS. As in the example, the derived terms may include terms specifically related to the intent to change a password, and so may be generated based on "change," "password," "system." Commonly appearing terms such as "want" does not identify or represent the intent, and so the derived terms may not be generated based on such terms.

Accordingly, a derived training set (e.g., TS') including additional expressions corresponding to the initial set of expressions of the training data may be generated. As such, where the initial set of expressions includes the training set, TS={'I want to change the password of my system'}, the derived training set may include an expanded set of expressions, e.g., TS'={"I want to change the password of my system", "I want to alter the password of my system", "I want to modify the password of my system", "I want to change the pwd of my system", ... }. Advantageously, with respect to the example, the cardinality of the initial set of expressions may be expanded to that of the new training set, TS', i.e., 2×3×3=18, based on a single user request (i.e., "I want to change the password of my system").

At Step S206, the cognitive training data expansion module 144 detects intent- and context-specific training data. The intent- and context-specific training data may include, for example, the terms of the initial and expanded sets of expressions, as previously described.

In an embodiment of the present invention, intent-specific terms of the sets of expressions may be detected based on a statistical language model generated based on the training dataset, TS. In the embodiment, the intent-specific terms of the sets of expressions may be detected based on a statistical language model generated based on the expanded training dataset, TS'. In the embodiment, the statistical language models may include, for example, the initial set of expressions of the training dataset, TS, and the additional expressions of the expanded training dataset, TS', respectively.

In general, to detect intent-specific terms the nouns, adjectives, and verbs that may be parsed, tokenized, and selected for determining associated synonyms and abbreviations should only include those terms that truly identify or correspond with the intent of the training dataset, TS. This may be performed by comparing the intent of the phrase from the expanded training data set to the corresponding phrase (i.e. phrase in which the phrase was derived from) of the training dataset. In the above example, "want" does not identify the intent, while "change" and "password" do. Further, under certain conditions, it may be beneficial to not determine "all" the synonyms of the terms. Instead, only those relevant to the context with respect to the intent (i.e., of the training data) should be determined, for example, to reduce noise in the language model. In the above example, "transform" is a synonym of "change", however, it's uncommon or atypical to find it to express a password change in the IT context.

In an embodiment of the present invention, an intent-specific term (e.g., representing an intent-specific expression) may be detected and extracted based on a ratio of occurrence, computed or determined in terms of its relative frequency of occurrence in the initial set of expressions of the training dataset, TS, with respect to its occurrence in the expanded training dataset, TS'. In the embodiment, a first unigram language model, $LM_{ts}$, may be generated based on the training dataset, TS. In the embodiment, a second unigram language model, $LM_{gen}$, may be generated based on a wider collection of documents, for example, one representative of the English language (i.e., the language of the TS). In the embodiment, the second unigram language model may include a wide collection of terms that are representative and close to the context of the intent of $LM_{ts}$.

Selecting as intent-specific terms those that have the highest frequencies of occurrence in the $LM_{ts}$ may result in the selection of terms like "want," as described above, which are commonly used in any language context. That is, "want" may appear in contexts related to changing passwords, as well as in contexts related to getting information about UEFA Champions League finalists. As an example, a unigram LM, $LM_{gen}$, may be built of a wider collection of documents, for example, one which may be representative of the English language (the language of the TS). Further, $LM_{gen}$ may include a wide collection of terms that are representative and close to the context of the intent of LM, e.g., so as to include terms related to sports if the intent is soccer.

In an embodiment of the present invention, the ratio of occurrence, $r(w_k)$, for an intent-specific term, $w_k$, may be determined by way of Equation 1:

$$r(w_k) = f_{LMts}(w_k)/f_{LMgen}(w_k)$$

where f(.) is the frequency of occurrence of a term in a statistical language model, LM (e.g., $LM_{ts}$, $LM_{gen}$). In the embodiment, each intent-specific term (e.g., representing an intent-specific expression) may be detected and extracted (i.e., selected) based on a corresponding ratio of occurrence, r(.), that is determined to exceed a predetermined threshold.

For example, for each term $w_k$ of the vocabulary V (e.g., of $LM_{ts}$ and $LM_{gen}$), an occurrence ratio $r(w_k)=f_{LMts}(w_k)/f_{LMgen}(w_k)$ may be determined, where f(.) is the frequency of occurrence of a term in $LM_{ts}$ and $LM_{gen}$, respectively. Commonly occurring terms of the language may have a comparable frequency of occurrence in TS and in the generic model, while TS specific terms tend to have a higher frequency of occurrence in TS than in the generic model. In an embodiment of the present invention, each intent-specific term that has an occurrence ratios, r(.), exceeding a predetermined threshold may be selected.

In other words, commonly occurring terms (i.e., expressions) of a language tend to have comparable frequency of occurrence in training sets, relative to their frequency of occurrence in generic language models. TS specific terms tend to have a higher frequency in TS than in the generic model. Accordingly, the intent-specific terms having a higher ratio, r(.), (e.g., exceeding the predetermined threshold) may be selected.

In an embodiment of the present invention, detecting the intent-specific training data (i.e., the intent-specific terms) may include, for example, determining synonyms and abbreviations of a restricted set of terms, $T'=\{ist_1, ist_2, \ldots, ist_Y\}$, where "ist" is an intent-specific term. The restricted set of terms, T', may include, for example, an expression of the initial or expanded sets of expressions of the training data, TS, and/or an expression of the expanded training dataset TS'.

In an embodiment of the present invention, the intent-specific terms may be detected based on paradigmatic relation of each term with respect to the intent-specific term, ist, of the restricted set of terms, $T'=\{ist_1, ist_2, \ldots, ist_Y\}$. Terms in paradigmatic relations are interchangeable in a phrase (i.e., they are in the same syntactic or semantic class). For example, terms in paradigmatic relation may include Monday and Tuesday, cat and dog, and so on. Generally, detecting the intent-specific terms based on the paradigmatic relations may be particularly effective where the statistical language model, $LM_{gen}$ is representative of a context that is relevant to the intent. Accordingly, a set of synonyms, $S_k=\{(s^{(k)}_1, s^{(k)}_2, \ldots)\}$, for each intent-specific term: $ist_k$, may be determined. In the embodiment, the additional expressions corresponding to the initial set of expressions of the training data may be generated based on the set of synonyms, $S_k=\{s^{(k)}_1, s^{(k)}_2, \ldots\}$, for each intent-specific term: $ist_k$.

In an embodiment of the present invention, detecting the intent-specific training data may include, for example, using existing knowledge bases for the specific language, such as WordNet, online dictionaries, and the like. The appropriate choice of the particular knowledge bases used may be chosen as a matter of design.

In an embodiment of the present invention, the context-specific training data may be detected based on the set of synonyms $S_k=\{s^{(k)}_1, s^{(k)}_2, \ldots\}$ for each intent-specific term: $ist_k$. In the embodiment, detecting the context-specific training data may include, for example, reducing the set of synonyms $S_k=\{s^{(k)}_1, s^{(k)}_2, \ldots\}$ for each intent-specific term to include only those that are truly used together in the context of the intent.

In an embodiment of the present invention, the set of synonyms for each intent-specific term may be reduced based on, for example, syntagmatic relations between terms of the set of synonyms. In general, two terms are in syntagmatic relation if they have a high probability to appear together in a phrase of a language model. Terms may have a high probability to appear together, for example, based on semantic relation and co-occurrence. For example, the terms "car" and "drive" are in syntagmatic relation. That is, the context-specific training data may be detected from each $S_k$ based on whether they are in syntagmatic relation with at least one $ist_k$ in the statistical language model, $LM_{gen}$, generated based on the expanded training dataset, TS'. Accordingly, the derived training set may be generated based on the training data from the client application 112 with respect to a relatively small set of well selected synonyms (i.e., expressions), where P>>N.

At Step S208, the training module 146 trains the NLC for implementation.

Training the NLC may include performing a training stage to train the NLC, as previously described. In an embodiment of the present invention, the training stage may be performed based on the updated training data including the expanded set of distinct, diversified, and expansive expressions corresponding to an intent of the initial training data, as previously described. In the embodiment, performing the training stage may include training the NLC based on the intent-specific training data, the context-specific training data, or both. The intent- and context-specific training data may include that as described with reference to Step S206. In the embodiment, the training stage may additionally be performed based on the initial training data. Advantageously, performing the training stage based on the updated training data may achieve a high degree of natural language comprehension by and of the NLC. The NLC may subsequently be implemented, for example, by a chatbot, or the like, in accordance to embodiments of the present invention.

Figure 2B:
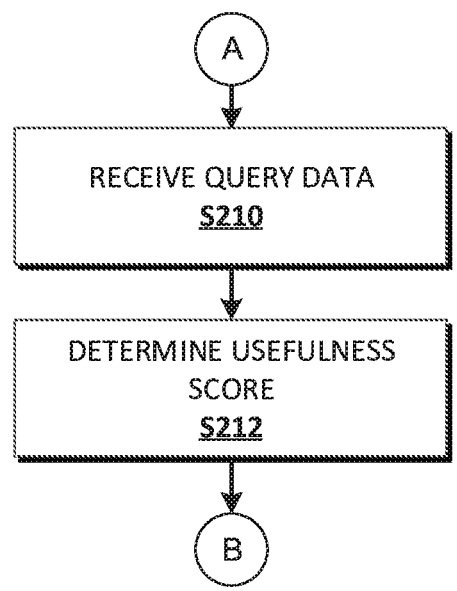
FIG. 2B is a flowchart depicting operational steps of an aspect of the interpretation management system, in accordance with an embodiment of the present invention.

FIG. 2B is a flowchart depicting operational steps of an aspect of the interpretation management system 100, in accordance with an embodiment of the present invention.

At Step S210, the data transceiver module 142 receives the query data from the client application 112.

At Step S212, the cognitive training data expansion module 144 of determines a usefulness score with respect to the query data.

In an embodiment of the present invention, the usefulness score may be determined with respect to individual expressions of the expanded training data, TS'. In the embodiment, the usefulness score may be determined based on an accuracy or correctness of a classification of an expressed intent by the NLC. In the embodiment, the accuracy or correctness may be determined, for example, based on a level of end-user satisfaction with the classification as such may be expressed by user feedback and interactions. The expressed intent may be of, for example, a user input request, $u_i$, as such may be received from the end-user of the client application 112. The user input request, ui, may be received from an end-user of the chatbot. In the embodiment, the usefulness score may be determined by computing a distance, $d(ui, text'_k)$, for each text in TS'. The value of a particular distance may then be implemented, for example, to determine the usefulness score, which may be used to weight or increment relationships between the text in TS' (i.e., the $text'_k$ close to ui). This allows, for example, identification overtime of the most useful texts in TS'. In the embodiment, the distance, $d(ui, text'_k)$, for each text in TS', may be defined, for example, by representing each text and user input as a vector of terms and calculating the inner product of the vectors: $d(a, b)=Sum(a_i*b_i)$.

In an embodiment of the present invention, a quality of the expanded training set, TS', may be measured and improved, either periodically or continuously, based on the query data. In the embodiment, a determination may be made as to which expressions of the expanded training set either reduce or improve the quality of the expanded training set.

In an embodiment of the present invention, a determination that an expression of the expanded training set reduces the quality of the expanded training set may be made based on whether a corresponding usefulness score falls below a predetermined threshold. In the embodiment, the expression may be removed from the expanded training set. In the embodiment, the expressions from the query data may be generated and added to the expanded training set, such as described with respect to Steps S204, S206, and S208, in order to train the NLC.

Figure 3:
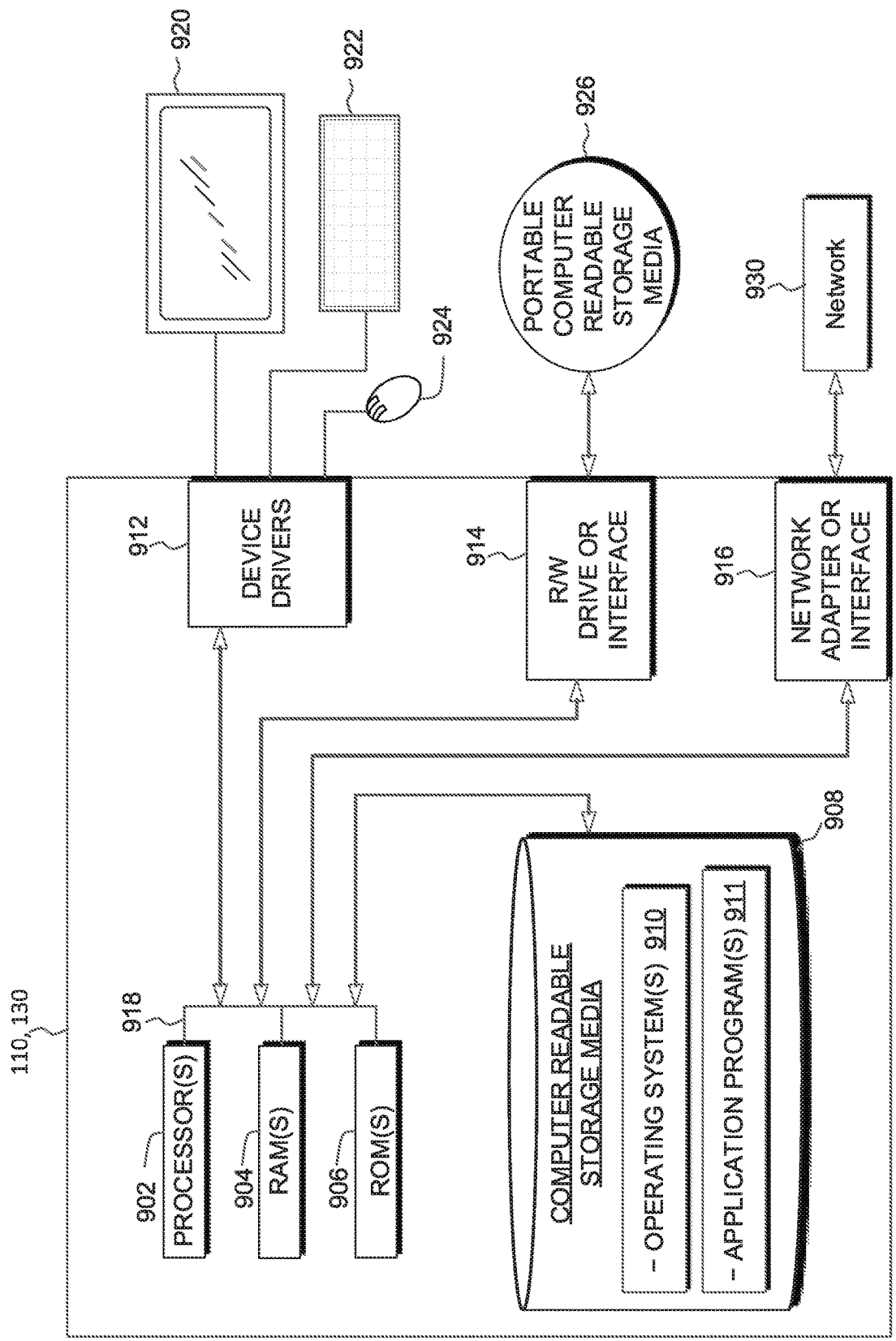
FIG. 3 is a block diagram depicting a client device and/or an interpretation management device, in accordance with an embodiment of the present invention.

FIG. 3 is a block diagram depicting a client device 110 and/or an interpretation management device 130, in accordance with an embodiment of the present invention. As depicted in FIG. 3, the client device 110 and/or the interpretation management device 130 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as the interpretation management program 140 residing on the interpretation management device 130, as depicted in FIG. 1, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The client device 110 and/or the interpretation management device 130 may also include a R/W drive or interface 914 to read from and write to one or more portable computer readable storage media 926. Application programs 911 on the client device 110 and/or the interpretation management device 130 may be stored on one or more of the portable computer readable storage media 926, read via the respective R/W drive or interface 914 and loaded into the respective computer readable storage media 908. The client device 110 and/or the interpretation management device 130 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers. The client device 110 and/or the interpretation management device 130 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may include hardware and software (stored on computer readable storage media 908 and/or ROM 906).

The interpretation management device 130 can be a standalone network server, or represent functionality integrated into one or more network systems. In general, the client device 110 and/or the interpretation management device 130 can be a laptop computer, desktop computer, specialized computer server, or any other computer system known in the art. In certain embodiments, the interpretation management device 130 represents computer systems utilizing clustered computers and components to act as a single pool of seamless resources when accessed through a network, such as a LAN, WAN, or a combination of the two. This implementation may be preferred for data centers and for cloud computing applications. In general, the client device 110 and/or the interpretation management device 130 can be any programmable electronic device, or can be any combination of such devices.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
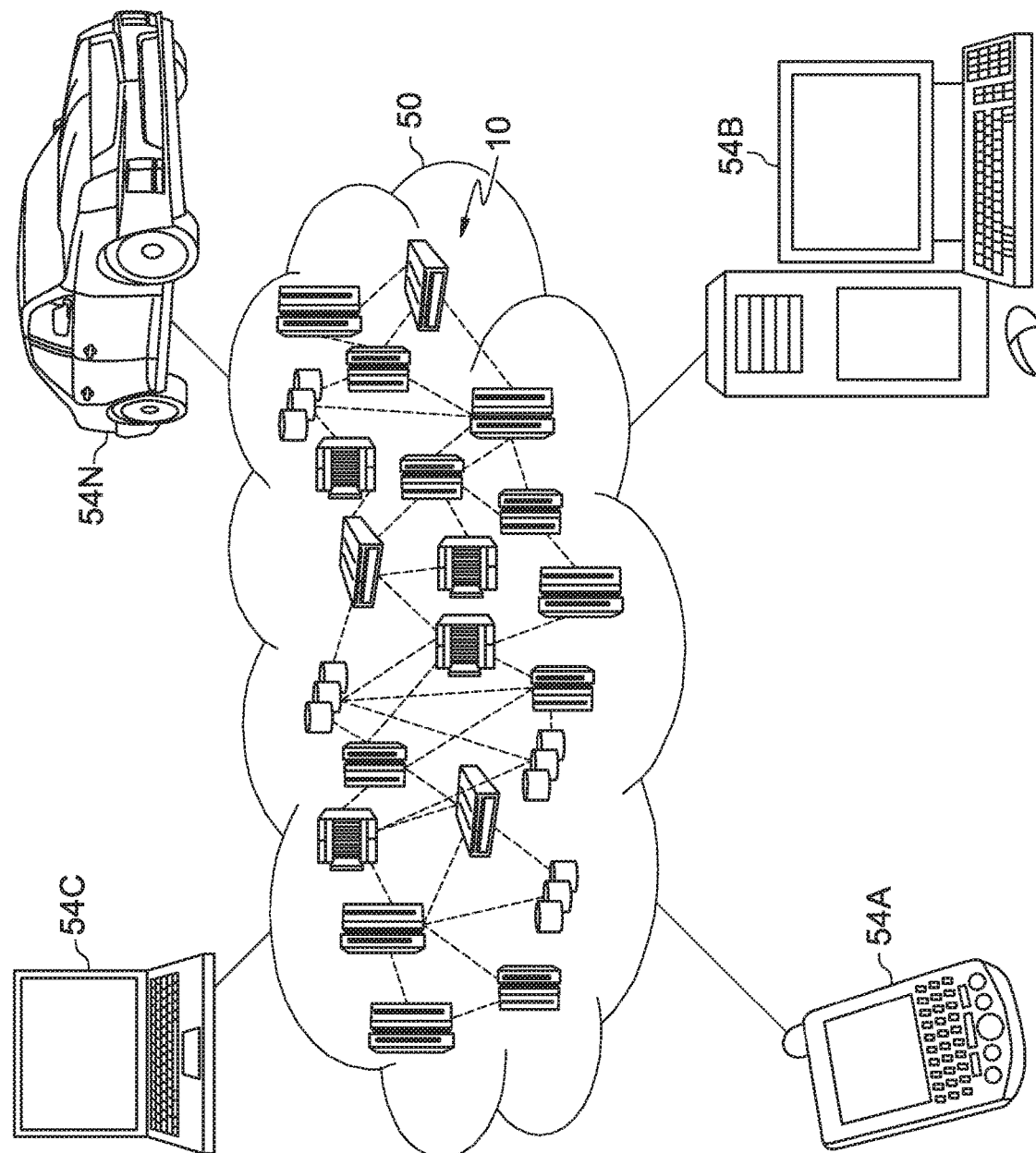
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
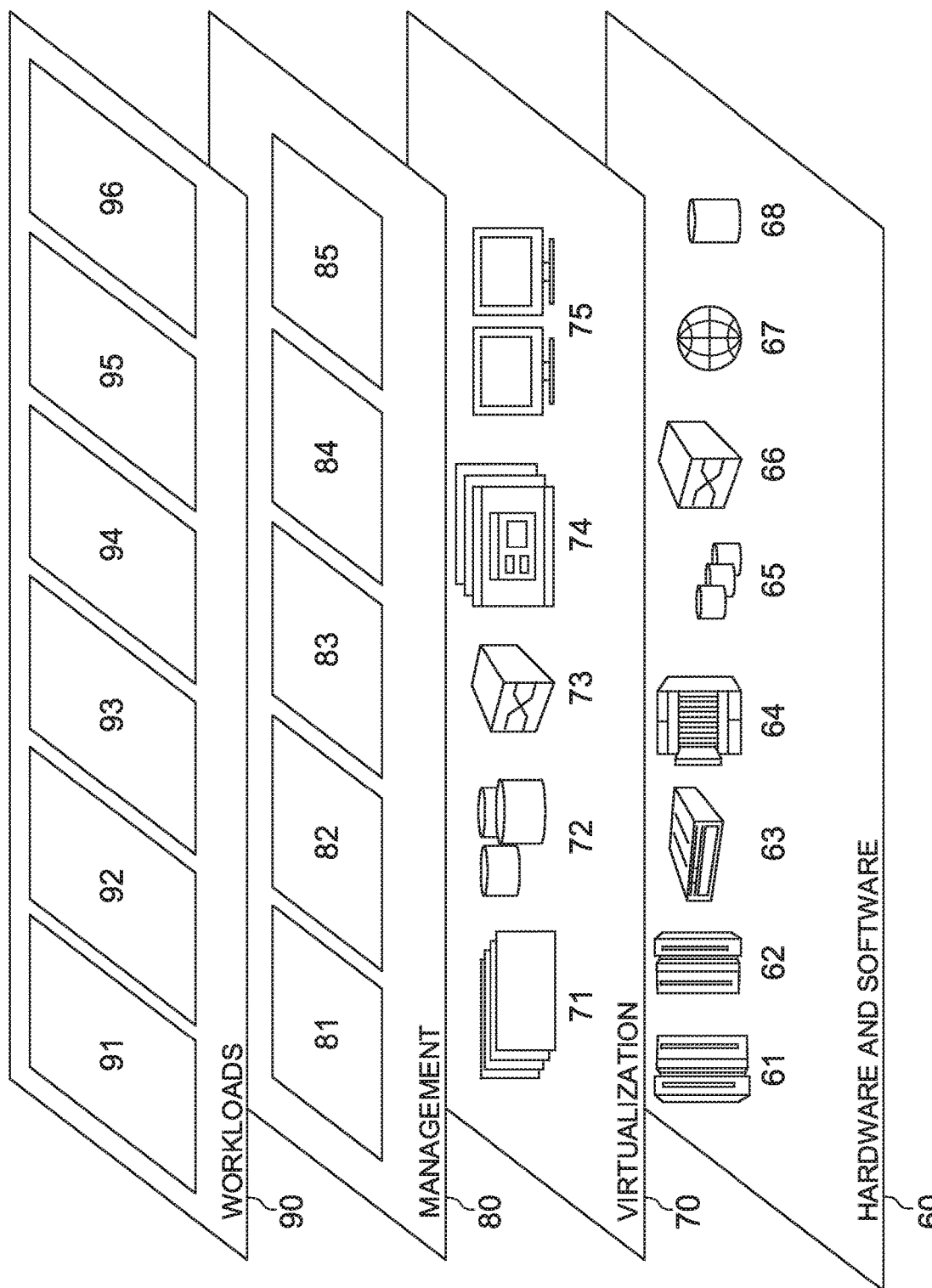
FIG. 5 depicts abstraction model layers, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and interpretation management 96. Interpretation management 96 may include functionality for enabling the cloud computing environment to perform steps of the disclosed method, in accordance with embodiments of the present invention.

While the invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the present invention has been disclosed by way of example for purposes of illustration, and not limitation.

What is claimed is:

1. A computer-implemented method for training a natural language classifier associated with a chat interface of a computer system, the method comprising:
based on a training dataset comprising an initial set of expressions corresponding to an intent, generating additional expressions corresponding to the intent;
detecting intent-specific training data based on the initial set of expressions and the additional expressions, wherein detecting the intent-specific training data comprises detecting intent-specific terms that correspond to the intent and generating a set of synonyms for the intent-specific terms;
detecting context-specific training data, wherein detecting the context-specific training data comprises reducing the set of synonyms for the intent-specific terms by including synonyms used only in a context of the intent to generate the additional expressions;
training the natural language classifier based on the initial set of expressions and the additional expressions corresponding to the intent as well as based on the intent-specific training data and the context-specific training data; and
determining, by the trained natural language classifier, an intent expressed by a detected query based on the initial set of expressions and the additional expressions by which the natural language classifier was trained.

2. The computer-implemented method of claim 1, further comprising:
detecting intent-specific expressions corresponding to the intent, wherein the intent-specific expressions comprise terms that are in paradigmatic relation with an intent-specific term of the training dataset.

3. The computer-implemented method of claim 1, further comprising:
detecting context-specific expressions corresponding to the intent, wherein the context-specific expressions comprise terms that are in syntagmatic relation.

4. The computer-implemented method of claim 1, further comprising:
detecting intent- and context-specific terms of the initial set of expressions and the additional expressions corresponding to the intent.

5. The computer-implemented method of claim 1, wherein generating additional expressions corresponding to the intent comprises parsing and tokenization of terms of the initial set of expressions corresponding to the intent.

6. The computer-implemented method of claim 5, wherein parsing and tokenization of terms of the initial set of expressions corresponding to the intent comprises part-of-speech tagging of the terms of the initial set of expressions corresponding to the intent.

7. The computer-implemented method of claim 1, further comprising:
determining a usefulness score of an expression of the generated additional expressions corresponding to the intent, wherein the usefulness score is determined based on user feedback with respect to a corresponding user input request.

8. A computer system for training a natural language classifier associated with a chat interface of a computer system, the computer system comprising:
one or more computer processors, one or more computer-readable storage media, and program instructions stored on one or more of the computer-readable storage media for execution by at least one of the one or more computer processors, the program instructions, when executed by the at least one of the one or more computer processors, causing the computer system to perform a method comprising:
based on a training dataset comprising an initial set of expressions corresponding to an intent, generating additional expressions corresponding to the intent;
detecting intent-specific training data based on the initial set of expressions and the additional expressions, wherein detecting the intent-specific training data comprises detecting intent-specific terms that correspond to the intent and generating a set of synonyms for the intent-specific terms;

detecting context-specific training data, wherein detecting the context-specific training data comprises reducing the set of synonyms for the intent-specific terms by including synonyms used only in a context of the intent to generate the additional expressions;

training the natural language classifier based on the initial set of expressions and the additional expressions corresponding to the intent as well as based on the intent-specific training data and the context-specific training data; and determining, by the trained natural language classifier, an intent expressed by a detected query based on the initial set of expressions and the additional expressions by which the natural language classifier was trained.

9. The computer system of claim 8, further comprising:
detecting intent-specific expressions corresponding to the intent, wherein the intent-specific expressions comprise terms that are in paradigmatic relation with an intent-specific term of the training dataset.

10. The computer system of claim 8, further comprising:
detecting context-specific expressions corresponding to the intent, wherein the context-specific expressions comprise terms that are in syntagmatic relation.

11. The computer system of claim 8, further comprising:
detecting intent- and context-specific terms of the initial set of expressions and the additional expressions corresponding to the intent.

12. The computer system of claim 8, wherein generating additional expressions corresponding to the intent comprises parsing and tokenization of terms of the initial set of expressions corresponding to the intent.

13. The computer system of claim 12, wherein parsing and tokenization of terms of the initial set of expressions corresponding to the intent comprises part-of-speech tagging of the terms of the initial set of expressions corresponding to the intent.

14. The computer system of claim 8, further comprising:
determining a usefulness score of an expression of the generated additional expressions corresponding to the intent, wherein the usefulness score is determined based on user feedback with respect to a corresponding user input request.

15. A computer program product for training a natural language classifier associated with a chat interface of a computer system, the computer program product comprising:
one or more computer-readable storage devices and program instructions stored on at least one of the one or more computer-readable storage devices for execution by at least one or more computer processors of a computer system, the program instructions, when executed by the at least one of the one or more computer processors, causing the computer system to perform a method comprising:

based on a training dataset comprising an initial set of expressions corresponding to an intent, generating additional expressions corresponding to the intent;

detecting intent-specific training data based on the initial set of expressions and the additional expressions, wherein detecting the intent-specific training data comprises detecting intent-specific terms that correspond to the intent and generating a set of synonyms for the intent-specific terms;

detecting context-specific training data, wherein detecting the context-specific training data comprises reducing the set of synonyms for the intent-specific terms by including synonyms used only in a context of the intent to generate the additional expressions;

training the natural language classifier based on the initial set of expressions and the additional expressions corresponding to the intent as well as based on the intent-specific training data and the context-specific training data; and determining, by the trained natural language classifier, an intent expressed by a detected query based on the initial set of expressions and the additional expressions by which the natural language classifier was trained.

16. The computer program product of claim 15, further comprising:
detecting intent-specific expressions corresponding to the intent, wherein the intent-specific expressions comprise terms that are in paradigmatic relation with an intent-specific term of the training dataset.

17. The computer program product of claim 15, further comprising:
detecting context-specific expressions corresponding to the intent, wherein the context-specific expressions comprise terms that are in syntagmatic relation.

18. The computer program product of claim 15, further comprising:
detecting intent- and context-specific terms of the initial set of expressions and the additional expressions corresponding to the intent.

19. The computer program product of claim 15, wherein generating additional expressions corresponding to the intent comprises parsing and tokenization of terms of the initial set of expressions corresponding to the intent.

20. The computer program product of claim 19, wherein parsing and tokenization of terms of the initial set of expressions corresponding to the intent comprises part-of-speech tagging of the terms of the initial set of expressions corresponding to the intent.

* * * * *